(12) United States Patent
Nakamichi et al.

(10) Patent No.: US 7,079,493 B2
(45) Date of Patent: Jul. 18, 2006

(54) DEVICE AND METHOD FOR COLLECTING TRAFFIC INFORMATION

(75) Inventors: Koji Nakamichi, Kawasaki (JP);
Kenya Takashima, Kawasaki (JP);
Toshio Soumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 09/981,019

(22) Filed: Oct. 16, 2001

(65) Prior Publication Data

US 2002/0085498 A1   Jul. 4, 2002

(30) Foreign Application Priority Data

Dec. 28, 2000   (JP) .............................. 2000-400634

(51) Int. Cl.
*G01R 31/08* (2006.01)

(52) U.S. Cl. ...................... 370/252; 370/235; 370/400

(58) Field of Classification Search ................... None
See application file for complete search history.

(56) References Cited

U.S. PATENT DOCUMENTS

| | | | | |
|---|---|---|---|---|
| 5,233,604 A | * | 8/1993 | Ahmadi et al. | 370/238 |
| 5,289,462 A | * | 2/1994 | Ahmadi et al. | 370/232 |
| 5,309,433 A | * | 5/1994 | Cidon et al. | 370/390 |
| 5,347,511 A | * | 9/1994 | Gun | 370/255 |
| 5,600,794 A | * | 2/1997 | Callon | 709/241 |
| 5,881,051 A | * | 3/1999 | Arrowood et al. | 370/248 |
| 5,914,939 A | * | 6/1999 | Serkowski | 370/254 |
| 6,744,775 B1 | * | 6/2004 | Beshai et al. | 370/409 |
| 6,801,534 B1 | * | 10/2004 | Arrowood et al. | 370/400 |
| 6,928,483 B1 | * | 8/2005 | Cain | 709/238 |
| 2002/0071442 A1 | * | 6/2002 | Li | 370/432 |

FOREIGN PATENT DOCUMENTS

EP          1 035 751          9/2000

OTHER PUBLICATIONS

C-Y Lee a Celer N Gammage S Ghanti Nortel Networks Gerald Ash AT & T: Distributed Route Exchangers, IETF Standard-Working-Draft, Internet Engineering Task Force, IETF, CH, Nov. 2000, XP015031474 ISSN: 0000-0004, *abstract* *p. 2-p. 4* *p. 7-p. 8*.

Norihito Fujita Atsushi Iwata Nec Corporation: Traffic Engineering Extensions to OSPF Summary LSA, IETF Standard-Working-Draft, Internet Engineering Task Force, IETF, CH, Mar. 2000, XP015013408 ISSN: 0000-0004 *the whole document*.

European Search Report dated Feb. 2, 2006.

* cited by examiner

*Primary Examiner*—Bob A. Phunkulh
(74) *Attorney, Agent, or Firm*—Katten Muchin Rosenman LLP

(57) ABSTRACT

The present invention provides a traffic information collecting device and method. A node in a communication network collects a first traffic information of a first link connected to an own node. And also the node receives second traffic information of second links connected to the other nodes. The second traffic information is transmitted from the other nodes. The node stores the first and second information. In consequence, the node can be informed of the conditions of the traffic of each link in the communication network based on the stored information. As the result, it becomes possible to control the load sharing in correspondence to the conditions of the traffic.

15 Claims, 12 Drawing Sheets

FIG. 5

/proc/net/dev file

| interface | Receive | | | | | | | | |
|---|---|---|---|---|---|---|---|---|---|
| | bytes | packets | errs | drop | fifo | frame | compressed | multicast |
| lo | 6084 | 67 | 0 | 0 | 0 | 0 | 0 | 0 |
| eth0 | 19954 | 324 | 0 | 0 | 0 | 0 | 0 | 0 |
| eth1 | 0 | 0 | 0 | 0 | 0 | 0 | 0 | 0 |
| eth2 | 0 | 0 | 0 | 0 | 0 | 0 | 0 | 0 |
| atm0 | 10488 | 76 | 0 | 0 | 0 | 0 | 0 | 0 |
| atm1 | 0 | 0 | 0 | 0 | 0 | 0 | 0 | 0 |
| atm2 | 0 | 0 | 0 | 0 | 0 | 0 | 0 | 0 |

| interface | Transmit | | | | | | | | |
|---|---|---|---|---|---|---|---|---|---|
| | bytes | packets | errs | drop | fifo | colls | carrier | compressed |
| lo | 6084 | 67 | 0 | 0 | 0 | 0 | 0 | 0 |
| eth0 | 26630 | 267 | 0 | 0 | 0 | 0 | 0 | 0 |
| eth1 | 0 | 0 | 0 | 0 | 0 | 0 | 0 | 0 |
| eth2 | 0 | 0 | 0 | 0 | 0 | 0 | 0 | 0 |
| atm0 | 5054 | 83 | 0 | 0 | 0 | 0 | 0 | 0 |
| atm1 | 0 | 0 | 0 | 0 | 0 | 0 | 0 | 0 |
| atm2 | 0 | 0 | 0 | 0 | 0 | 0 | 0 | 0 |

FIG. 6

/proc/atm/device file

| interface type | ESI/"MAC" addr | AAL (Tx, err, Rx, err, drop) | |
|---|---|---|---|
| 0 eni | 0020ea00co84 | 0(0 0 0 0 0) | 0(83 0 76 0 0) |
| 1 eni | 0020ea005ee2 | 0(0 0 0 0 0) | 0(0 0 0 0 0) |
| 2 eni | 0020ea005e34 | 0(0 0 0 0 0) | 0(0 0 0 0 0) |

DEVICE AND METHOD FOR COLLECTING TRAFFIC INFORMATION

BACKGROUND OF THE INVENTION

1. Field of the Invention

The present invention relates generally to a traffic information collecting device, a traffic information collecting method, and a traffic information collecting program product in a communication network, and more particularly, to a traffic information collecting device, a traffic information collecting method, and a traffic information collecting program product for collecting information required for making a load sharing in the communication network.

The present invention relates to a node in the communication network, having a function to collect information required for making the load sharing in the communication network.

2. Description of the Related Art

The Internet is a connectionless network in which a connection is not established, and communication data are divided into IP packets on which an IP (Internet Protocol) address is labeled for transmission. The IP packets are transferred between routers based on the IP addresses, to deliver to a destination router or computer (hereinafter referred to simply as "an destination").

It is determined according to a routing protocol which route between the routers is used for relay based on the IP address to deliver the IP packets to the destination. As the routing protocol, at present, the RIP (Routing Information Protocol) or the OSPF (Open Shortest Path First) protocol is generally used. In these routing protocols, basically, a shortest route (or a shortest path) up to the destination is acquired based on cost of each link in the communication network (for example, a hop count), and the shortest route is set as a communication route of the IP packets.

In these routing protocols, however, the shortest route is only acquired based on cost, and a route is not acquired taking into consideration conditions of a traffic of each link. Moreover, only when a topology of the communication network changes, the new route is set, and setting or modification is not conducted in real time. On the other hand, with the spread of the Internet, a packet amount (in other words, a traffic amount or load) intercommunicating in the internet is abruptly increased.

As the result, congestion generates in the route determined by the routing protocol.

To be sure, but in the OSPF protocol there is a routing called an equal cost multipath that a plurality of the routes are determined in order to disperse the IP packets to the plurality of routes. However, this routing can be used only in the case where the plurality of routes having equal costs are present, and also as the OSPF protocol is used, it is impossible to cope with real-time fluctuations of the load of the communication network.

Then, at present, as a technology system for avoiding the congestion in the internet, traffic engineering is discussed. This traffic engineering generally sets a plurality of routes up to the destination, and also monitors conditions of the traffic of each route in real time, and selects an idle route or a route having a small load to transmit the IP packets, and disperses the load (traffic) between the plurality of routes.

In order to conduct such the traffic engineering, it is necessary that each router is informed of information in the traffic containing busy condition of each route.

SUMMARY OF THE INVENTION

With the foregoing in view, it is an object of the present invention to allow a node in a communication network to collect traffic information to thereby achieve load sharing depending on the conditions of the traffic.

In order to achieve the above object, according to a first aspect of the present invention there is provided in a communication network having a plurality of nodes, which transmit, receive or transfer communicated information, and a plurality of links (communication links), which connect the plurality of nodes to each other, a traffic information collecting device, which is provided in at least one of the plurality of nodes, for collecting traffic information all or some of the plurality of links, comprising: a traffic information collecting unit for collecting first traffic information of a first link connected to an own node among the plurality of links; a traffic information transmitting unit for transmitting, to the other nodes, said first traffic information collected by said traffic information collecting unit, using a message prescribed in a communication protocol in the communication network; a traffic information receiving unit for receiving second traffic information of second links connected to the other nodes among the plurality of links, said second traffic information being transmitted from the other nodes; and a traffic information storage for storing said first and second traffic information.

According to a second aspect of the present invention there is provided in a communication network having a plurality of nodes, which transmit, receive or transfer communicated information, and a plurality of links, which connect the plurality of nodes to each other, a traffic information collecting device, which is provided in at least one of the plurality of nodes, for collecting traffic information all or some of the plurality of links, comprising: a traffic information collecting unit for collecting first traffic information of a first link connected to an own node among the plurality of links; and a traffic information storage for storing said first traffic information collected by the traffic information collecting unit, and second traffic information of second links connected to the other nodes among the plurality of links, said second traffic information being transmitted from the other nodes.

According to the information collecting device in the present invention, the node in the communication network collects the first traffic information of the first link connected to the own node. And also the node receives the second traffic information of the second links connected to the other nodes, said second traffic information being transmitted from the other nodes. The node stores the first and second information. In consequence, the node can be informed of the conditions of the traffic of each link in the communication network based on the stored information. As the result, it becomes possible to control the load sharing in correspondence to the conditions of the traffic.

Preferably, the traffic information collecting device further comprises a traffic information transferring unit for transferring said second information to the other first links excluding the received first link.

Thus, it is possible to propagate the second traffic information transmitted to a certain node, to nodes other than the certain node as well, and the other nodes receiving the second traffic information also can obtain the traffic information. As the result, all nodes in the communication network can grasp the conditions of the traffic of each link in the communication network.

BRIEF DESCRIPTION OF THE DRAWING

FIGS. 5 and 6 show exemplary of data in a system status that OS of the router 11S collects/controls in real time;

DESCRIPTION OF THE PREFERRED EMBODIMENTS

Configuration of Communication Network 1

Figure 1:
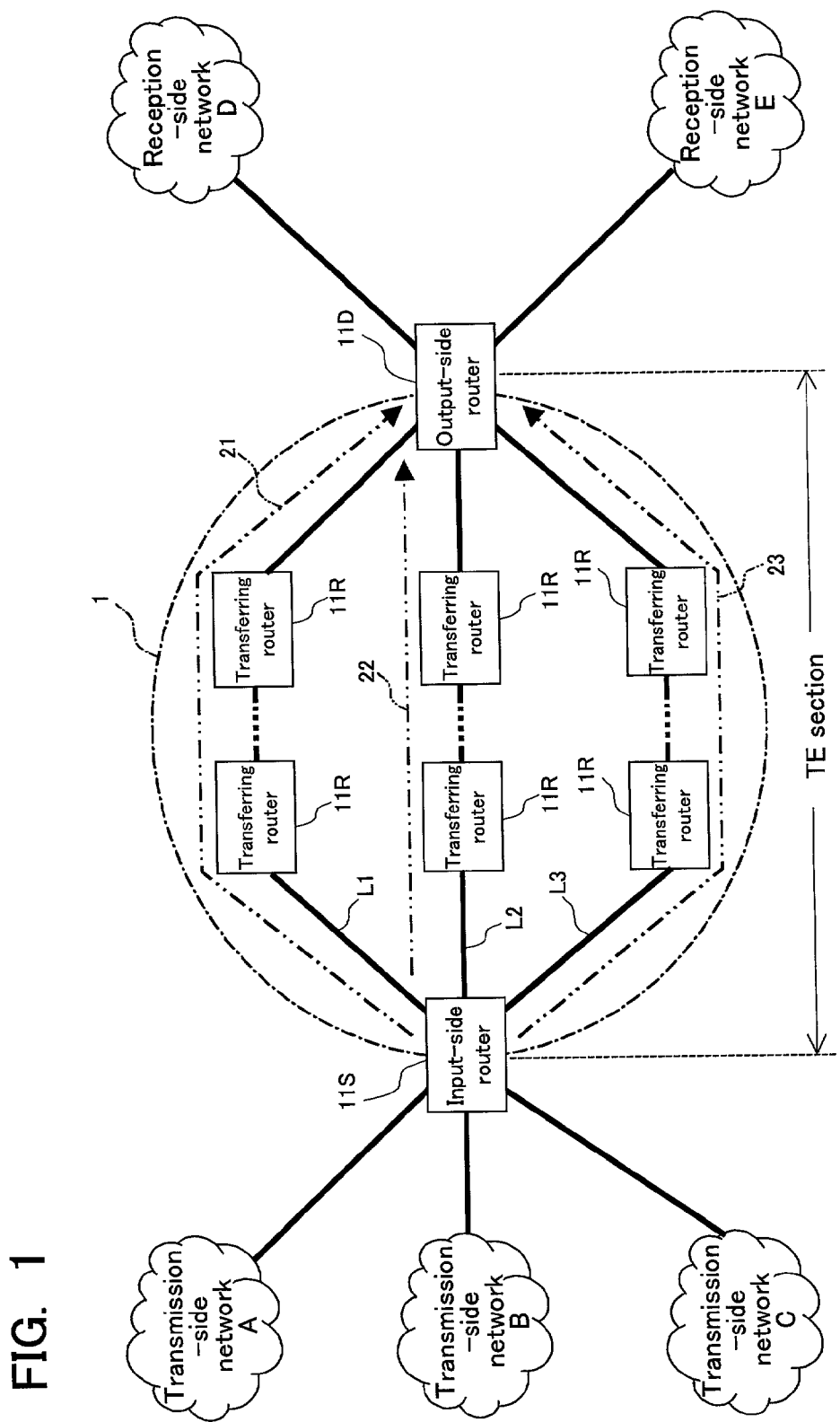
FIG. 1 is a block diagram showing a schematic configuration of a communication network according to an embodiment of the present invention.

FIG. 1 is a block diagram showing a schematic configuration of a communication network 1 having a node including "an information collecting device" according to the present invention. The communication network 1 forms a part of the Internet in this embodiment, and also is a communication network which performs a load sharing by traffic engineering (hereinafter called "TE"). Furthermore, the communication network 1 is, in this embodiment, a communication network that transmits and receives IP packets (hereinafter merely called "packets") in the asynchronous transfer mode (hereinafter called "ATM").

The communication network 1 is connected to transmission-side communication networks A, B, C for transmitting the packets to the communication network 1; and reception-side communication networks D, E for receiving the packets transmitted from the communication network 1, as external communication networks.

These external communication networks are assorted into "the transmission-side communication network" and "the reception-side communication network," for conveniences of explanation of the TE. Accordingly, the transmission-side communication network does not mean a network which only has a transmission function of the packets, and further the reception-side communication network does not mean a network which only has a reception function of the packets. For example, there is a case where the packets are transmitted from the communication network 1 to the transmission-side communication networks A, B, C, and also there is a case where the packets are transmitted from the reception-side communication networks D, E to the communication network 1.

These transmission-side communication networks A, B, C and reception-side communication networks D, E form a part of the Internet, and in this embodiment, they are constructed by Ethernet.

The communication network 1 includes a plurality of routers (a label switch router, to be mentioned later) as one example of "a node." These routers contain an input-side router 11S, an output-side router 11D and a plurality of transferring routers 11R.

When the input-side router 11S receives the packets from the transmission-side communication network A, B, or C (or a computer terminal (not shown) connected to the input-side router 11S), the TE is executed with respect to the packets, and the packets are transmitted to the neighboring transferring router 11R in a route (path) set based on the TE. The transferring routers 11R are stationed between the input-side router 11S and the output-side router 11D, and transfer the packets to the output-side router 11D relaying the packets from the input-side router 11S. The output-side router 11D transmits the packets transmitted from the input-side router 11S via the transferring routers 11R, to the reception-side communication network D or E (or the computer terminal (not shown) connected to the output-side router 11D).

Hereupon also, the routers are assorted into the input-side router 11S, the output-side router 11D and the transferring routers 11R for conveniences of explanation of the TE, and for example, there is a case where the input-side router 11S is an output-side router, or there is a case where the output-side router 11D is an input-side router. Furthermore, hereinafter, when these input-side router 11S, output-side router 11D and transferring routers 11R are not distinguished from each other, they are named generically "a router 11" merely.

A link is provided between the routers 11 as "a communication link" (or "a transmission link") in which respective routers are physically connected to each other. For example, three links L1 to L3 are connected between the input-side router 11S and one of neighboring three transferring routers 11R, respectively.

In this manner, the input-side router 11S is a starting point for executing the TE to packets transmitted from the external transmission-side communication networks A, B, C (and a computer terminal connected to the input-side router 11S), and the output-side router 11D is an ending point of the TE. Accordingly, a section from the input-side router 11S to the output-side router 11D is sometimes called "a TE section."

According to this embodiment, the communication network 1 is configured so as to set a route by using MPLS (Multi-Protocol Label Switching) as one example of a label switch technology. For this reason, the input-side router 11S, output-side router 11D and transferring routers 11R are configured as a label switch router (hereinafter referred to as "LSR").

The MPLS is a technology for fusing a routing processing of an internet protocol of the layer 3 in the OSI reference model and a switching processing of the layer 2 such as ATM, frame relay, or the like. The LSR uses "a label" which is information of a lower level layer than an IP address, as packet transfer (packet switching) information. When an ATM switch is used for a packet transfer engine (label switch engine) of the LSR, VPI/VCI (Virtual Path Identifier/Virtual Connection Identifier) is used as the label. In other words, the IP addresses are mapped onto the labels (VPIs/VCIs) and a packet transfer is carried out by use of the labels.

The MPLS transfers the packets on the preset route (virtual connection) which is called the LSP (Label Switched Path). This LSP may be set along the route defined by a present routing protocol like the OSPF protocol, and may be set independently of a route by the present routing protocol. Furthermore, a plurality of the LSPs can be set up to an destination (router or computer terminal).

Accordingly, the plurality of LSPs are set independently of the present routing protocol, and a load (traffic) is dispersed between these LSPs, thereby enabling the TE.

Furthermore, in the MPLS the plurality of LSPs needs not to be preset necessarily. It is possible that a router always monitors a traffic amount in the communication network 1, and when the traffic amount of a certain route is increased, the router searches another route directing to the same destination, sets a new LSP on the route, and shares the traffic to the new LSP. Thereby as well, it is possible to perform the dynamic TE in correspondence to a state of the traffic of the communication network.

A plurality of the LSPs can be set within one link. For example, within one link having a bandwidth of 100 [Mbps (M bit/sec)], the five LSPs with 20 [Mbps] can be set, respectively.

The setting of the LSP can be performed by reserving the bandwidth of the link in the route using, for example, RSVP (Resource Reservation Protocol) or RSVP-tunnel obtained by extending RSVP.

In the communication network 1, as the route (the label switching path, the virtual connection in the ATM) by this LSP, as shown in FIG. 1, three routes 21 to 23 have been in advance set, or dynamically generated. In other words, the input-side router 11S has the three routes 21 to 23 for transmitting the packets.

The respective three routes 21 to 23 are configured by the LSP(s) provided in one or two links or more. Furthermore, all the links configuring the respective routes 21 to 23 are not always different links, and any or all of the links are occasionally configured by the different LSPs provided in the same link.

The input-side router 11S is positioned on the boundary of the transmission-side communication networks A, B, C outside of the TE section. The router 11S adds a label to a packet transmitted from the transmission-side communication network A, B or C, and transmits it to the transferring router 11R.

The transferring router 11Rs carry out label-switching for the labeled packets, and transfer the labeled packets to the output-side router 11D. Accordingly, the transferring router 11Rs can transfer (label-switching transfer) the packets by only label information without retrieving the routing entry of the IP addresses of the packets.

The output-side router 11D is positioned on the boundary of the reception-side communication networks D, E outside of the TE section. The output-side router 11D removes the label of the packets from the transferring router 11R, and transmits these packets to the reception-side communication network D or E (or the computer terminal of the output-side router 11D).

As the communication network 1 employs the ATM as mentioned above, the label refers to here the VPI/VCI, and also the packets are transferred as ATM cells.

In order to make the load sharing of the traffic by setting the route of the LSP(S) in correspondence to a state of the traffic of the communication network 1, each router 11 exchanges information in the traffic of each link and of each LSP in each link connected to itself. Hereinafter "information in the traffic" is merely referred to as "traffic information". In exchanging this traffic information, according to this embodiment, an opaque LSA (Link State Advertisement) that is a peculiar LSA in OSPF (Open Shortest Path First) protocol is used.

In the opaque LSA, there is in particular not any provision in information that the opaque LSA can include therein, excluding a LSA header and LSR interface information to be mentioned below. In this way, the opaque LSA has a freely using region. Furthermore, in the opaque LSA, there is not either any provision what time propagated, excluding a point that flooding is used as its propagation (transmission) technique. In this way each router can propagate the opaque LSA(s) at the desirable time. Moreover, as the opaque LSA follows the OSPF, the opaque LSA can be used in the communication networks such as the Internet, etc. Accordingly, the opaque LSA which has the freely using region containing the traffic information is propagated, whereby the traffic information can be exchanged between the routers in the present communication network such as the Internet, etc.

Configuration of the Router 11

Figure 2:
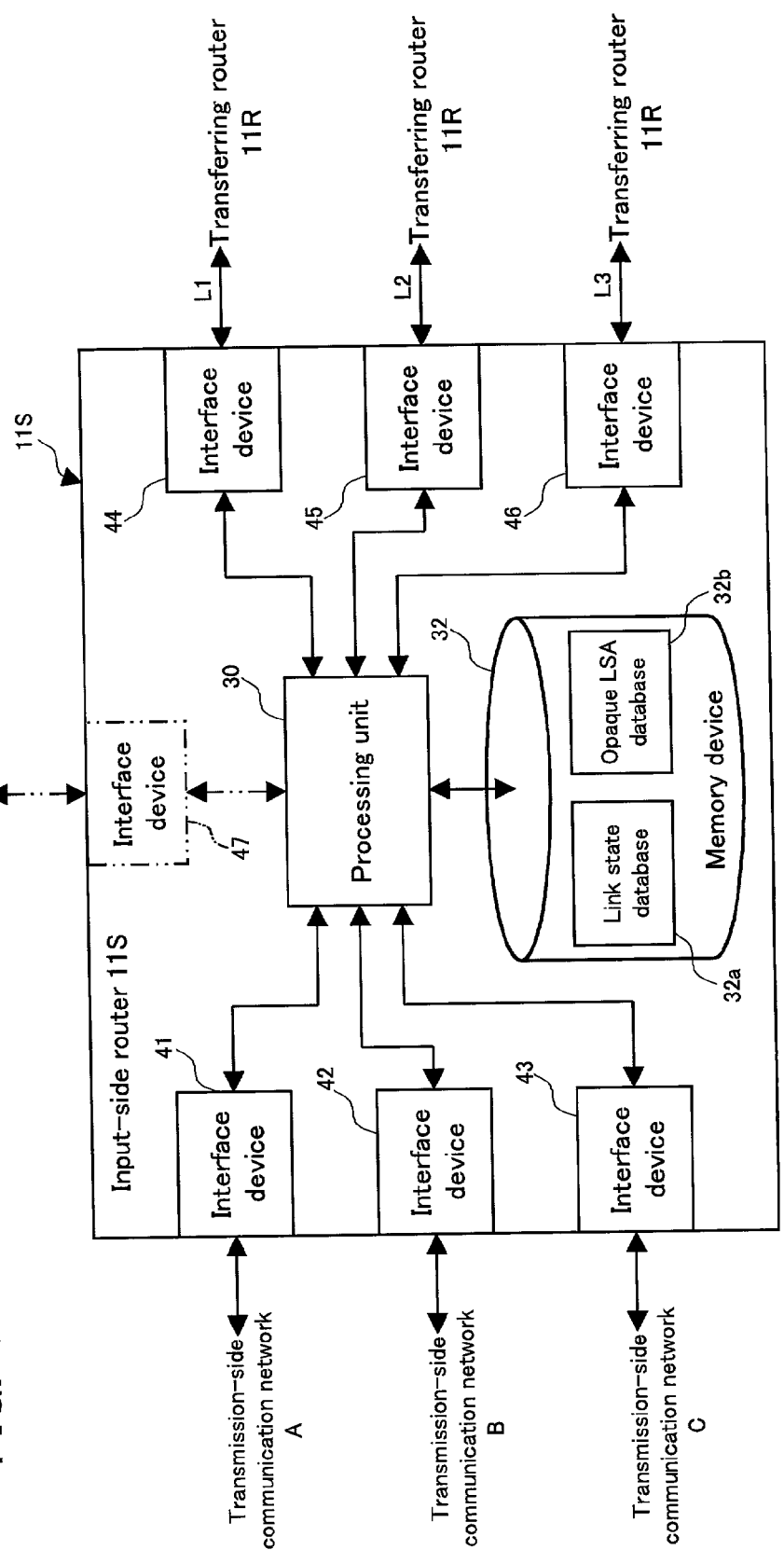
FIG. 2 is a block diagram showing a configuration of an input-side router.

FIG. 2 is a block diagram showing a configuration of the input-side router 11S by representing the router 11. The input-side router 11S includes a processing unit 30; a memory device 32; and interface devices 41 to 46. Furthermore, when the computer terminal is connected to the input-side router 11S, a computer terminal interface device 47 is provided. Incidentally, as the transferring router 11R and output-side router 11D have the same configuration as the input-side router 11S, excluding a case where the number of interface device(s) is (are) different and a case where the connection destination(s) is (are) different, only the configuration of the input-side router 11S will be explained hereupon.

The memory device 32 can be configured by a hard disk device, etc., and contains a link state database 32a and an opaque LSA database 32b. The link state database 32a is a database defined by the OSPF protocol and stores link states. The opaque LSA database 32b is a database storing the opaque LSAs, and the detailed description will be mentioned later.

The processing unit 30 has a CPU, a memory (RAM, ROM, etc.), and the like (not shown). This processing unit 30 controls the memory device 32 and the interface devices 41 to 46 (47) in accordance with a program stored in the internal memory or the memory device 32. And also the processing unit 30 carries out setting of routes, control of the load sharing in correspondence to a state of the traffic, transmission and reception of the packets (ATM cells), generation, transmission and reception of the opaque LSAs, update of the link state database by the received opaque LSAs, update of the opaque LSA database by the received opaque LSA, or the like according to the program.

The interface devices 41 to 46 (47) contains an I/O buffer, and process I/O of the packet (ATM cell) for transferring respective connected links under the control of the processor 30.

A hardware switch configured by a hardware circuit is provided in the router 11S, and can transmit and receive the packets (ATM cells) (containing generation of the ATM cells and switching of the labels (VPIs/VCIs)).

Data Configuration of the Opaque LSA

Figure 3:
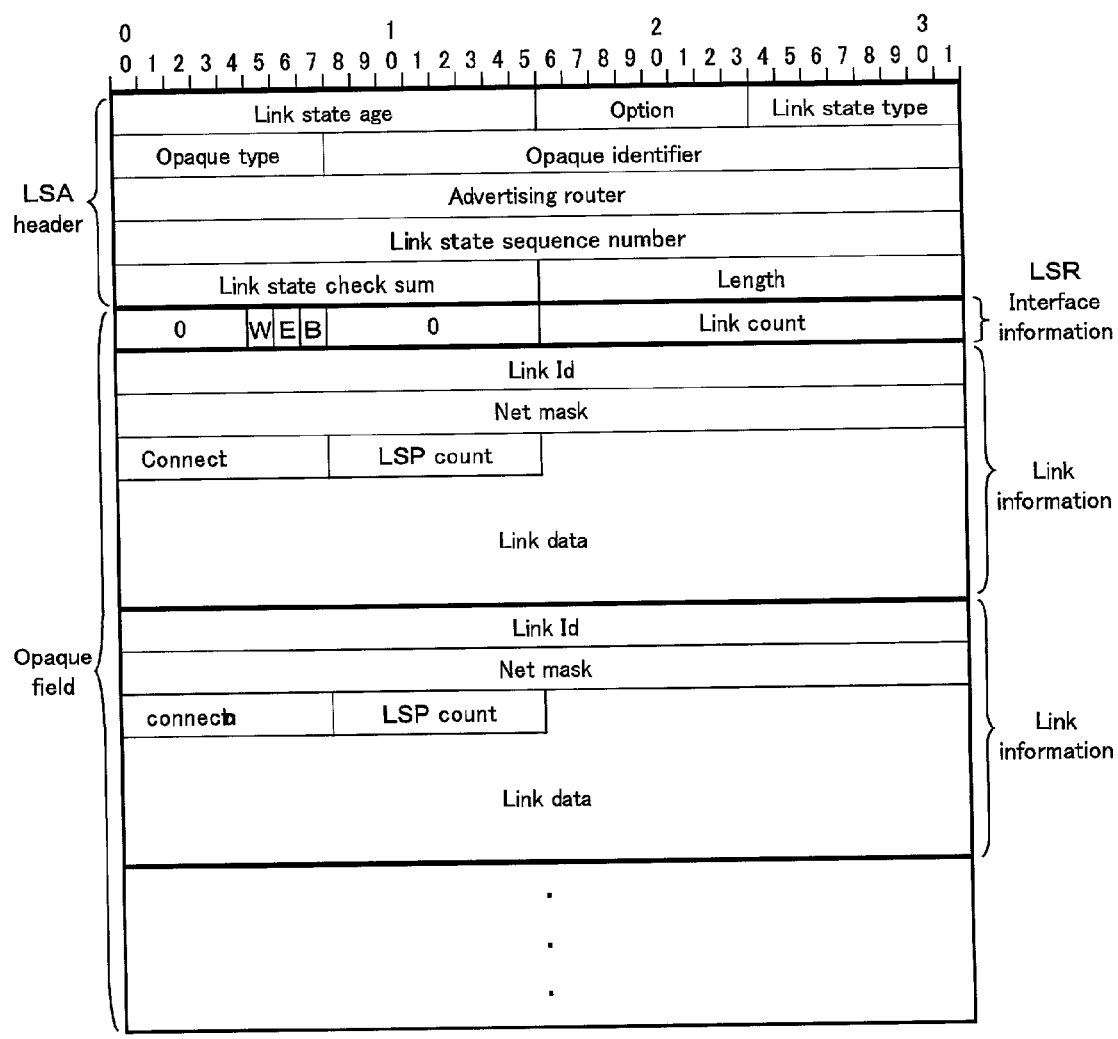
FIG. 3 shows a data configuration of an opaque LSA in the OSPF protocol.

The traffic information is flooded between the routers 11 by use of the opaque LSA(s) in the OSPF protocol, as mentioned above. This opaque LSA has a data configuration shown in FIG. 3. In FIG. 3, a digit designated in an uppermost part is a bit number. Accordingly, FIG. 3 shows that the opaque LSA stands in a row in 32 bits (4 bytes) unit.

There is not any provision of the opaque LSA, excluding the fields of the LSA header and LSR interface information, and the opaque LSA has a freely using field (a field of link information of FIG. 3). Accordingly, according to this embodiment, the traffic information is flooded between the routers 11 by use of the opaque LSAs having the data configuration shown in FIG. 3.

The opaque LSA is assorted largely into the LSA header and an opaque field.

The LSA header has 20 bytes, and has the same data configuration as the normal LSA (i.e., the LSA other than the opaque LSA). In other words, the LSA header is constructed by respective fields such as a link state age, an option, a link state type, an opaque type, an opaque identifier (an opaque ID), an advertising router, a link state sequence number (LS sequence number), a link state checksum (LS checksum), and a length.

"The link state age" has 2 bytes, and designates a lifetime (second unit) of this opaque LSA, namely a valid period.

"The option" has 1 byte, and is a field where it is set so that the router supports an optional function, or the support level can be transmitted to the other routers. A second bit of this "option" field is called 0 bit, and designates whether or not the router supports the opaque LSA (is opaque-capable).

"The link state type" has 1 byte, and designates a type of LSA. In the opaque LSA, a value of the link state type is 9, 10 or 11, and a flooding scope differs corresponding to this value.

When this value is 9, the flooding scope of the opaque LSA is "link-local," and within a local (sub)network. In the case of 10, the flooding scope is "area-local," and the opaque LSA is not flooded beyond the area that it is originated into. In the case of 11, the flooding scope is "equivalent to AS-external LSA," and the opaque LSA is flooded throughout the AS (Autonomous System). In particular, (1) the opaque LSA is flooded in all transit area; (2) the opaque LSA is not flooded from backbones to stub areas; and (3) the opaque LSA is not generated from a certain router into stub areas connected to the router.

"The advertising router" has 4 bytes, and is a field storing an IP address of the router that creates and advertises the opaque LSA. The link state number and link state checksum are used in the case where 2 or more opaque LSAs created by the same advertising router are present, when it is determined which one is up-to-date (latest temporally). "The length" is has 2 bytes, and designates a length (a byte number) of the opaque LSA.

"The opaque field" includes LSR interface information and one or more sets of link information. The number of the sets of the link information is equal to the number of links connected to the router 11.

The LSR interface information has 4 bytes, and is configured by an upper 2-byte E_B field and a lower 2-byte link count field. "The E_B field" designates whether the router is an area border router or an AS boundary router. "The link count" designates the number of links connected to the router.

"The link information" is configured by respective fields such as a link identifier, a net mask, a connection type, a LSP count, and a link data.

"The link identifier" has 4 bytes, and designates the IP address of the neighboring router or computer terminal connected to the link. "The net mask" has 4 bytes, and designates a (sub-)net mask of the link identifier. "The connection type" has 1 byte, and designates whether a destination of the link is a router, a computer terminal, or the like. The LSP count has 1 byte, and designates the number of LSP provided in the link. This value dynamically changes as the number of LSP during communication changes.

Figure 4:
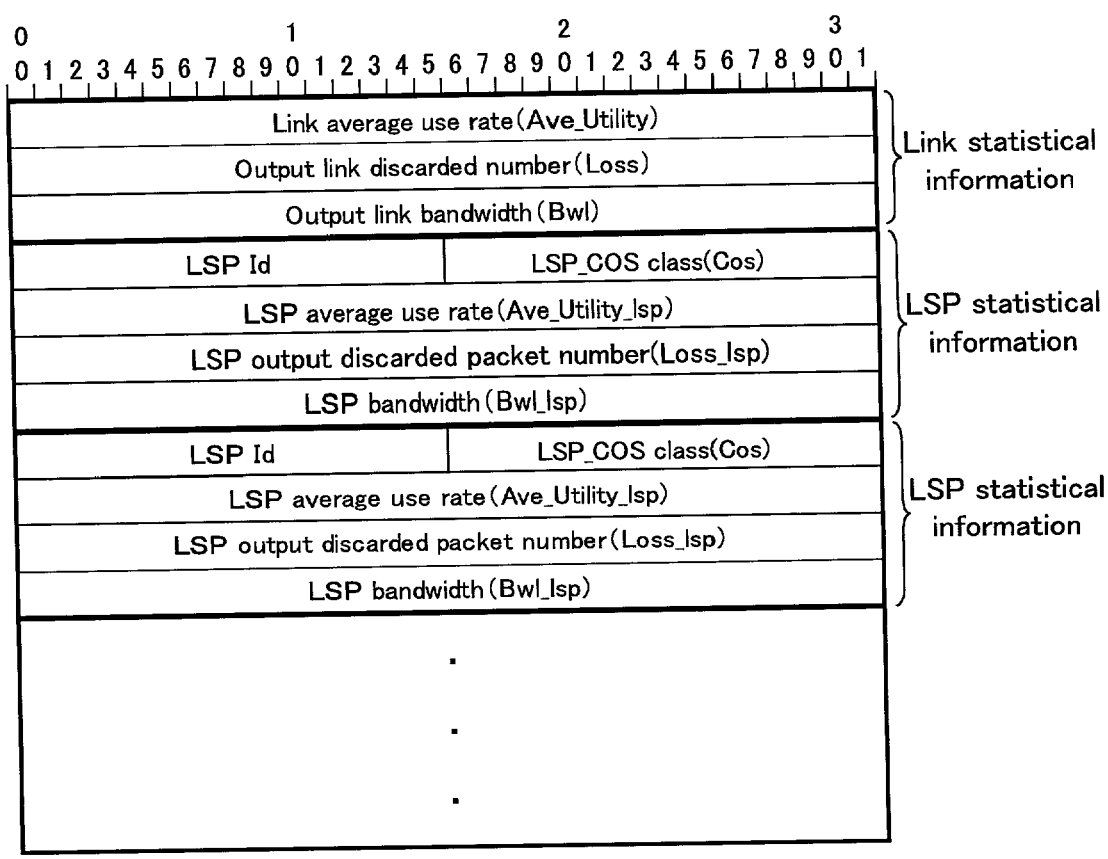
FIG. 4 shows a data configuration of a link data.

"The link data" is configured by a plurality of data. FIG. 4 shows a data configuration of the link data. The link data have link statistical information of the link and LSP statistical information of each LSP formed in the link. These link statistical information and LSP statistical information are one example of "information in the traffic (traffic information)" pertaining to the present invention.

"The link statistical information" has an link average usage rate field (Ave_Utilization), an output link discarded packet number field (Loss), and an output link bandwidth field (Bwl).

"The link average usage rate" has 4 bytes, and designates an average usage rate of the link. This link average usage rate Ave_Utilization is calculated by the following equation (1):

$$\text{Ave\_Utilization} = \alpha \times CUTY(n) + (1-\alpha) \times CUTY(n-1) \quad (1)$$

This equation (1) is a calculation equation by a moving average. Here, $\alpha$ is a smoothing coefficient. $CUTY(n)$ designates a present (namely, time n) link usage rate, and $CUTY(n-1)$ designates a link usage rate of one time past (namely, time (n-1)), respectively, and they are obtained by the following equation (2):

$$CUTY(n) = [\text{the number of packets outputted to the output link from time } (n-1) \text{ to time } n]/[\text{Bandwidth of the output link}] \quad (2)$$

The average usage rate may be set as a maximum of the observed CUTY, and in this case, the average usage rate is represented by the following equation (3):

$$\text{Ave\_Utilization} = \max(\text{observed value}) \quad (3)$$

"The output link discarded packet number" has 4 bytes, and designates the total number of the discarded output packet of the link. The total number is calculated by the following equation (4):

$$\text{Loss}(n) = \text{Loss}(n-1) + N\text{Loss} \quad (4)$$

Here, Loss(n-1) is the total number of the output link discarded packets up to time (n-1) of one time past, and NLoss is the number of output link discarded packets generated from time (n-1) to time n.

"The output link bandwidth" has 4 bytes, and designates bandwidth [bps (bit/sec)] of an output link. This output link bandwidth has been in advance stored in a memory of the processing unit 30 or the memory device 32 of each router 11, and the stored value is written in the field of the opaque LSA.

"The LSP statistical information" has a LSP identifier field (Lsp_id), a LSP_COS class field (Cos_lsp), a LSP average usage rate field (Ave_Utility_lsp), a LSP output discarded packet number field (Loss_lsp), and a LSP bandwidth field (Bwl_lsp).

"The LSP identifier" has 2 bytes, and designates an identifier of the LSP. "The LSP_COS class" has 2 bytes, and designates the COS class of the LSP.

"The LSP average usage rate" has 4 bytes, and designates an average usage rate of the LSP, and is obtained by the equation that the output link is replaced by not a link, but LSP in the equations (1) and (2). Furthermore, similarly to the equation (3), it can be set to a maximum of the observed value in the LSP.

"The LSP output discarded packet number" has 4 bytes, and designates the total number of the discarded output packet of the LSP, and is obtained by replacing the output link by the LSP in the equation (4).

"The LSP bandwidth" designates bandwidth [bps] allocated when the LSP is set. This LSP bandwidht is stored in the memory of the processing unit 30 or the memory device 32 of the router 11 that has output links in which the LSPs are set, at the time of setting the LSP. The LSP bandwidth value in the memory is written in the field of the opaque LSA.

The above-mentioned link average usage rate, output link discarded packet number, LSP average usage rate, and LSP output discarded packet number are obtained on the basis of data (file) representing a system status (CPU load, the number of transferring packets, etc.). These data are, for example, collected and managed in real time by an operating system (OS: for example, Linux) of each router 11.

FIGS. 5 and 6 show examples of data in a system status that OS of the router 11S collects/manages in real time. FIG. 5 shows a content of the file in a directory "/proc/net/dev" of the memory device 32 provided in the router 11S in the form of table. FIG. 6 shows a content of the file in a directory "/proc/atm/device" of the memory device 32 in the form of table.

Figures shown in these drawings are examples of data at a certain time. Furthermore, these figures designate integrated values from when the router 11S is turned on, and as OS collects in real time (fixed time interval Δt), they change every moment. As these figures are integrated values, for example, by acquiring a difference between a value when referring to this table at time (n−1) and a value when referring to this table at time n, it is possible to acquire variation between 1 time from time (n−1) to time n.

The upper half part of the table shown in FIG. 5 designates data in reception of the router 11S as shown by a character of "Receive", and the lower half part designates data in transmission of the router 11S as shown by a character of "Transmit." Hereinafter, the upper half part of the table is called "a reception table," and the lower half part is called "a transmission table."

The "interface" in the reception table and transmission table designates the kind of interface connected to the router 11S. As this interface, there are "lo," "eth0," "eth1," "eth2," "atm0," "atm1," and "atm2."

"lo" is an abbreviation of "loopback device," and means an interface with the computer terminal (not shown in FIG. 1) connected to the router 11S. "eth0" to "eth2" mean the interface with the Ethernet. As the transmission-side communication networks (Ethernet) A to C are connected to the router 11S, as shown in FIG. 1, "eth0" means the interface with the transmission-side communication network A, and "eth1" means the interface with the transmission-side communication network B, and "eth2" means the interface with the transmission-side communication network C, respectively.

"atm0" to "atm2" mean the interface with the ATM. As shown in FIG. 1, as three links L1 to L3 of the communication network 1 configured by the ATM network are connected to the input-side router 11S, "atm0" means the interface with the link L1, "atm1" means the interface with the link L2, and "atm2" means the interface with the link L3, respectively.

The "bytes" of the reception table and transmission table designates a byte number received from each interface and a byte number transmitted to each interface, respectively. For example, it is indicated from the data of the interface "lo" that the input-side router 11S receives data of 6084 bytes from the computer terminal, and transmits the data of the same byte number to the interface "lo."

The "packets" of the reception table and transmission table designates a packet number received from each interface and a packet number transmitted to each interface, respectively. For example, it is indicated from the data of the interface "eth0" that the router 11S receives 324 packets from the transmission side communication network A and transmits 267 packets thereto.

The "errs" of the reception table and transmission table designates an error number of the reception packet from each interface and an error number of the transmission packet to each interface, respectively.

The "drop" of the reception table and transmission table designates a discard number of the reception packet from each interface and a discard number of the transmission packet to each interface, respectively.

The "fifo" of the reception table and transmission table designates a packet number (length of queue (FIFO)) of a reception process waiting and a packet number (length of queue (FIFO)) of a transmission process waiting, respectively.

The "frame" of the reception table designates a reception frame number, and the "compressed" designates a compressed packet number, and the "multicast" designates a reception multicast packet number, respectively.

The "colls" of the transmission table designates a generation number of collision in the Ethernet (CSMA/CD system), and the "carrier" designates a carrier detection number in the Ethernet, and the "compressed" designates a compressed packet number, respectively.

The "interface type" of the table shown in FIG. 6 designates three types of ATM interface of the links L1 to L3 of the communication network 1, and "0 eni" is No. 1 of interface name "eni," and "1 eni" is No. 2 of interface name "eni," and "2 eni" is No. 3 of interface name "eni."

The "ESI/"MAC addr"" designates a MAC (Media Access Control) address. The "AAL (Tx, err, Rx, err, drop)" designates statistical information in the packet of an ATM adaptation layer. The "Tx" designates a transmission packet number, and a left side "err" designates a transmission error number, and the "Rx" designates a reception packet number, and a right side "err" designates a reception error number, and the "drop" designates a reception discard packet number, respectively.

Both FIGS. 5 and 6 show data in the link, and the OS can collect data in each LSP provided in the link.

As this system state is collected in real time (each fixed time interval Δt) by the OS, data of each field of the above-mentioned link data are acquired based on these collected information.

For example, by acquiring a difference between "packets" of the transmission table of FIG. 5 at time (n−1) and "packets" of the transmission table at time n, an output packet number of the equation (2) is acquired. Furthermore, the output packet number which is the difference is divided by the bandwidth of the link, whereby CUTY(n) of the equation (2) is acquired. Furthermore, Ave_Utilization of the equation (1) is acquired based on this CUTY(n).

Furthermore, as the transmission table of FIG. 5 or the "drop" of FIG. 6 is an integrated value of the discard packet number, a value of the "drop" at time n is Loss(n) of the equation (4).

Flooding Method of the Opaque LSA (1) First Flooding Method

The opaque LSA is transmitted to other routers by use of the flooding. A timing of the flooding can be set, for example, in each fixed time interval Tth. This fixed time interval Tth is equal to or more than the time interval Δt when the system status is updated (preferably, the time interval Tth is equal to a positive integer times Δt), and is set to an interval that the communication network 1 is not congested by transmission of the opaque LSAs, and also an interval that the TE can effectively be conducted. The specific value is acquired by experiments, simulations, computations, etc.

Figure 7:
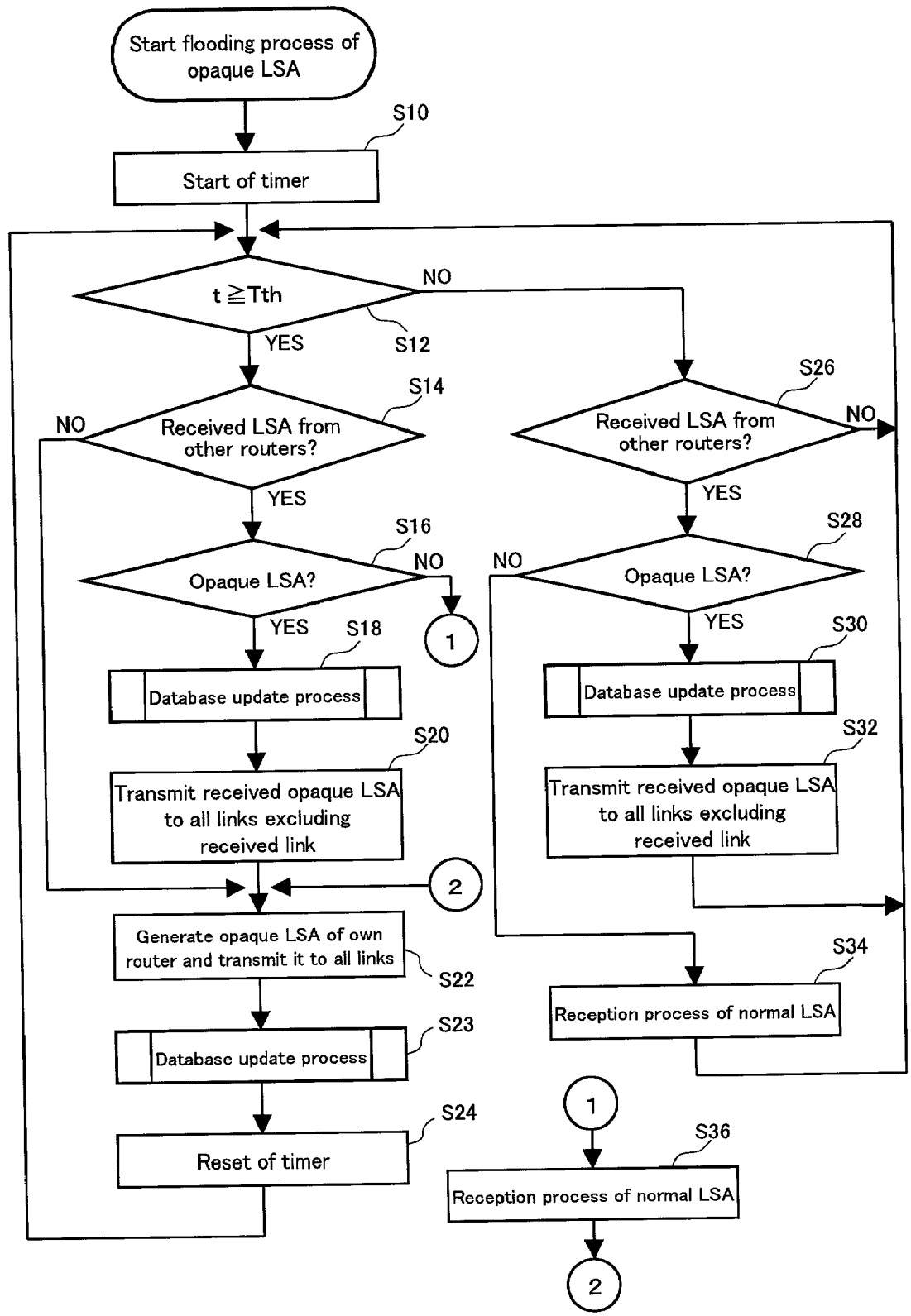
FIG. 7 is a flowchart showing a flow of a process of the first flooding method.

FIG. 7 is a flowchart showing a flow of a process of a first flooding method. This process is executed by the processing unit 30 (refer to FIG. 2).

First, when the router 11 is activated by turning on the router 11, etc., a timer (not shown) provided inside the processing unit 30 starts timing (step S10).

Subsequently, it is determined whether or not time t of the timer reaches the flooding time interval Tth (step S12). When not reaching it (NO in step S12), it is determined whether or not the LSAs are received from the other routers 11 (step S26). When the LSAs are not received from the other routers (NO in step S26), returning to step S12, and when received (YES in step S26), it is determined whether or not the received LSA is an opaque LSA (step S28). This determination is made by the value of the link state type of the above-described LSA header. When the link state type is 9, 10 or 11, it is determined that it is the opaque LSA, and when other than those, it is determined that it is a normal LSA (LSA other than the opaque LSA).

In the case of the opaque LSA (YES in step S28), the opaque LSA database is updated (to be mentioned below) (step S30), and after that, the received opaque LSA is transmitted (flooded) to all the links (output links) other than the received link (step S32). After that, the process will return to step S12. On the other hand, in the case of the normal LSA (NO in step S28), a reception process of the normal LSA is performed (step S34), and after that, the process is returned to step S12. This reception process of the normal LSA contains an update process of the link state database.

When time t of the timer is time Tth or more in step S12 (YES in step S12), it is determined whether or not the LSA is received from the other routers (step S14).

When the LSA is received (YES in step S14), the processes of steps S16 to S20, S36 are performed. These processes are similar to those in steps S28 to S32, S34, as above, respectively. Then, as the timer time t elapses in a fixed time interval Tth, the processing unit 30 creates the opaque LSA of its own router, and the opaque LSA is transmitted (flooding) to all the links (output links) (step S22).

Subsequently, the update process of the opaque LSA database by the opaque LSA of the own router is performed (step S23). And, the timer is reset to 0. Then the process will return to step S12.

On the other hand, in step S14, when the opaque LSA is not received from the other routers, the opaque LSA of the own router is generated immediately, and is transmitted to all the links (step S22). Then, the update process of the opaque LSA database by the opaque LSA of the own router is performed (step S23). And, the timer is reset (step S24), and the process will return to step S12.

(2) Second Flooding Method

Among the flooding methods, there is a method in which when the opaque LSA is received from the other routers, the received opaque LSA is transmitted, and also the opaque LSA which accommodates traffic information of the own router is generated to transmit. This method is called "a second flooding method".

Figure 8:
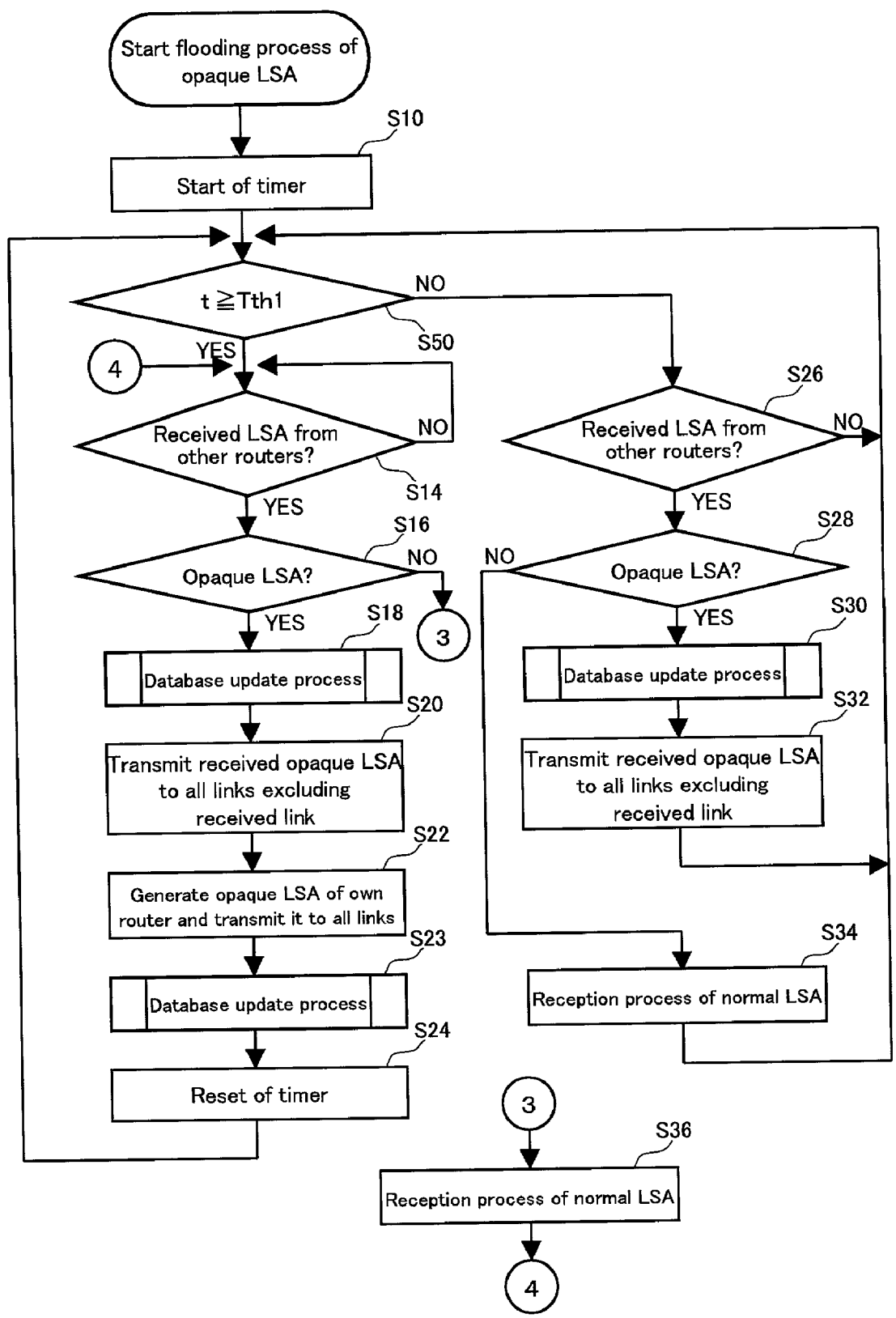
FIG. 8 is a flowchart showing a flow of a process of the second flooding method.

FIG. 8 is a flowchart showing a flow of a process of the second flooding method. The same symbol is labeled to the same process as that in the above-mentioned flowchart of FIG. 7, and the detailed description is omitted. The processing unit 30 executes this process.

First, when the router 11 is turned on, etc. and starts, the timer starts (step S10), and it is determined whether or not the time t of the timer reaches threshold time Tth1 (step S50). This threshold time Tth1 is set to a time interval which is time interval Δt or more when the OS of the router 11 updates the system status, and which is smaller than the time interval Tth in the first flooding method. The reason why the time Tth1 is set as above is that even when two or more opaque LSAs are received from the other routers before this fixed time Tth1 elapses, the opaque LSAs of the same content in the own router are not flooded twice or more.

When the time t of the timer reaches the threshold time Tth1 (YES of step S50), the processing unit 30 waits for receiving the opaque LSA from the other routers 11 (step S14). After receiving the opaque LSA, the processing unit 30 creates the opaque LSA which accommodates the traffic information of its own router and transmits it (steps S14 to S24, S36). Subsequently the process is returned to step S50.

On the other hand, when the time t of the timer does not reach the threshold time Tth1 (NO of step S50), even if the own router 11 receives the opaque LSA from the other routers 11, the own router 11 does not create the opaque LSA which accommodates the traffic information of itself and transmit it (steps S26 to S34). Subsequently the process is returned to step S50.

(3) Third Flooding Method

There is a third flooding method in which the first flooding method and the second flooding method are composited. In other words, the opaque LSAs are transmitted at the fixed time interval Tth (a first flooding method), and also when the own router receives the opaque LSA from the other routers 11, it transmits the received opaque LSA, and also creates the opaque LSA which accommodates the traffic information of itself to transmit (a second flooding method).

Figure 9:
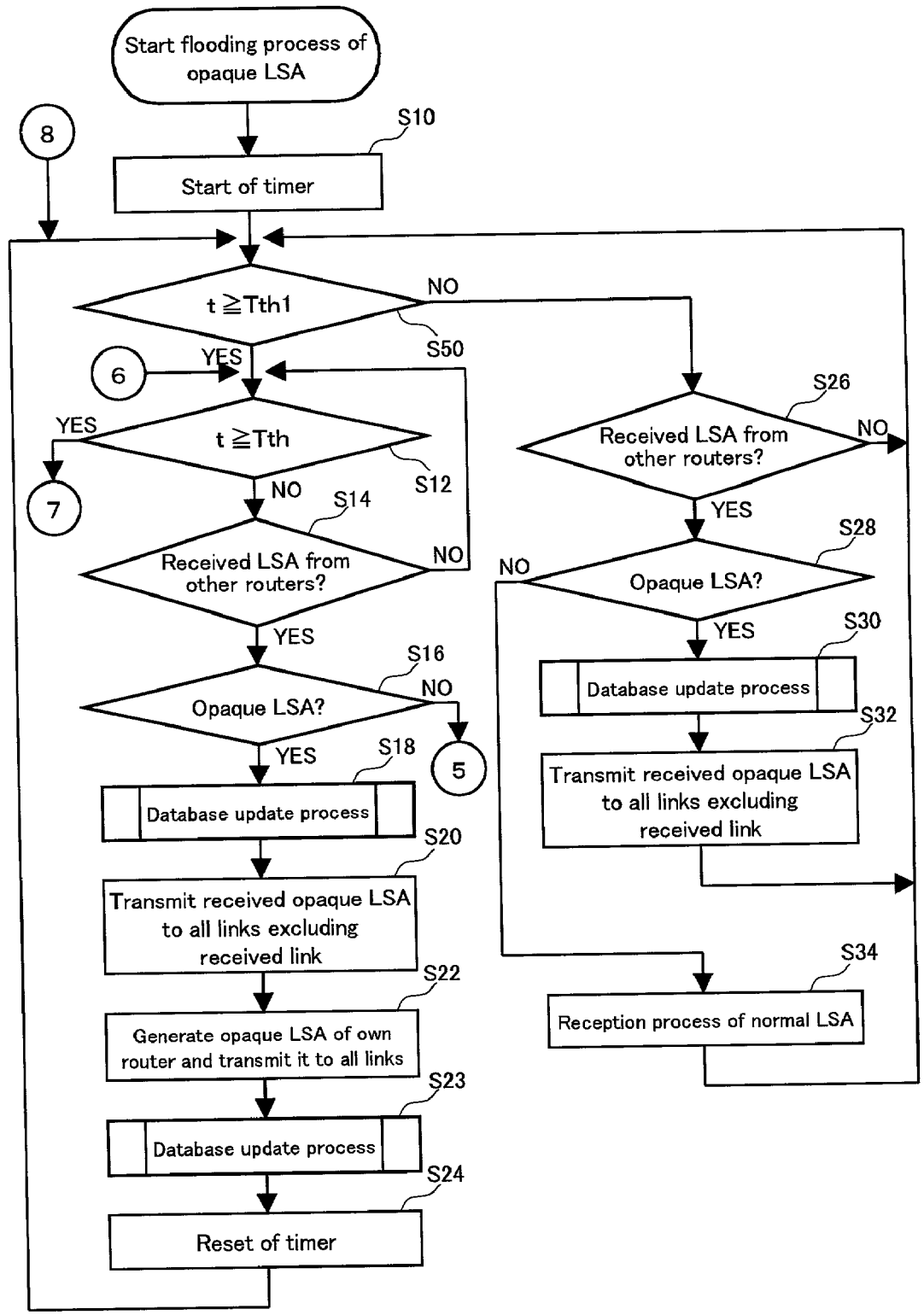
FIGS. 9 and 10 are flowcharts showing a flow of a process of a third flooding method.
Figure 10:
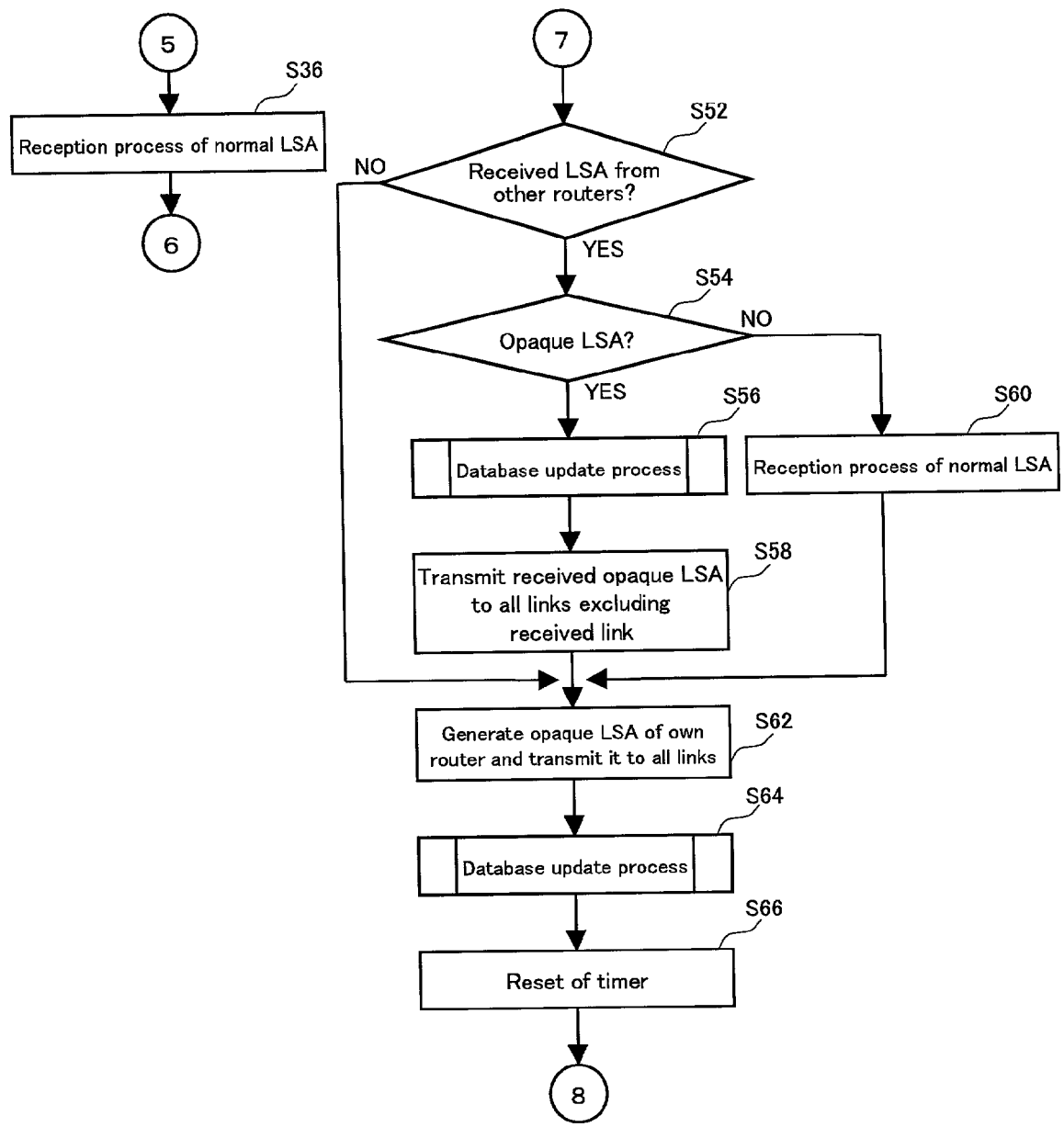

FIGS. 9 and 10 are flowcharts showing a flow of a process of the third flooding method. The same symbol is labeled to the same process as that in the above-mentioned flowchart of FIGS. 7 and 8, and the detailed description is omitted. The processing unit 30 executes this process.

After the timer starts (step S10), it is determined whether or not the time t of the timer elapses in the fixed time Tth1 as mentioned in the second flooding method (step S50).

When the time t of the timer does not reach the fixed time Tth1 (NO of step S50), the processes in steps S26 to S34 are executed. In other words, when the own router receives the opaque LSA from the other routers 11, the own router executes the database update process by the opaque LSA, and also transmits this opaque LSA to the other router. Subsequently, the process is returned to step S50.

On the other hand, when the time t of the timer reaches the fixed time interval Tth1 (YES of step S50), the timer time t is compared with the fixed time interval Tth mentioned in the first flooding method (step S12).

When the time t of the timer does not reach the fixed time interval Tth (NO of step S12), the own router waits for reception of the opaque LSA from the other routers 11, and executes the LSA received from the other routers 11 (database update process, transmission process to the other router, or the like) (steps S16 to S24, S36). Subsequently, the process is returned to step S50.

On the other hand, when the time t of the timer reaches the fixed time interval Tth (YES of step S12), the own router creates the opaque LSA which stores the traffic status of the own router irrespective of presence or absence of reception of the opaque LSA from the other routers and transmits it (steps S52 to S64). Incidentally, the processes of steps S52 to S60 are similar to the processes of steps S26 to S34, respectively, and the processes of steps S62 to S64 are similar to the processes of steps S22 to S24, respectively. Subsequently, the process is returned to step S50.

Figure 12:
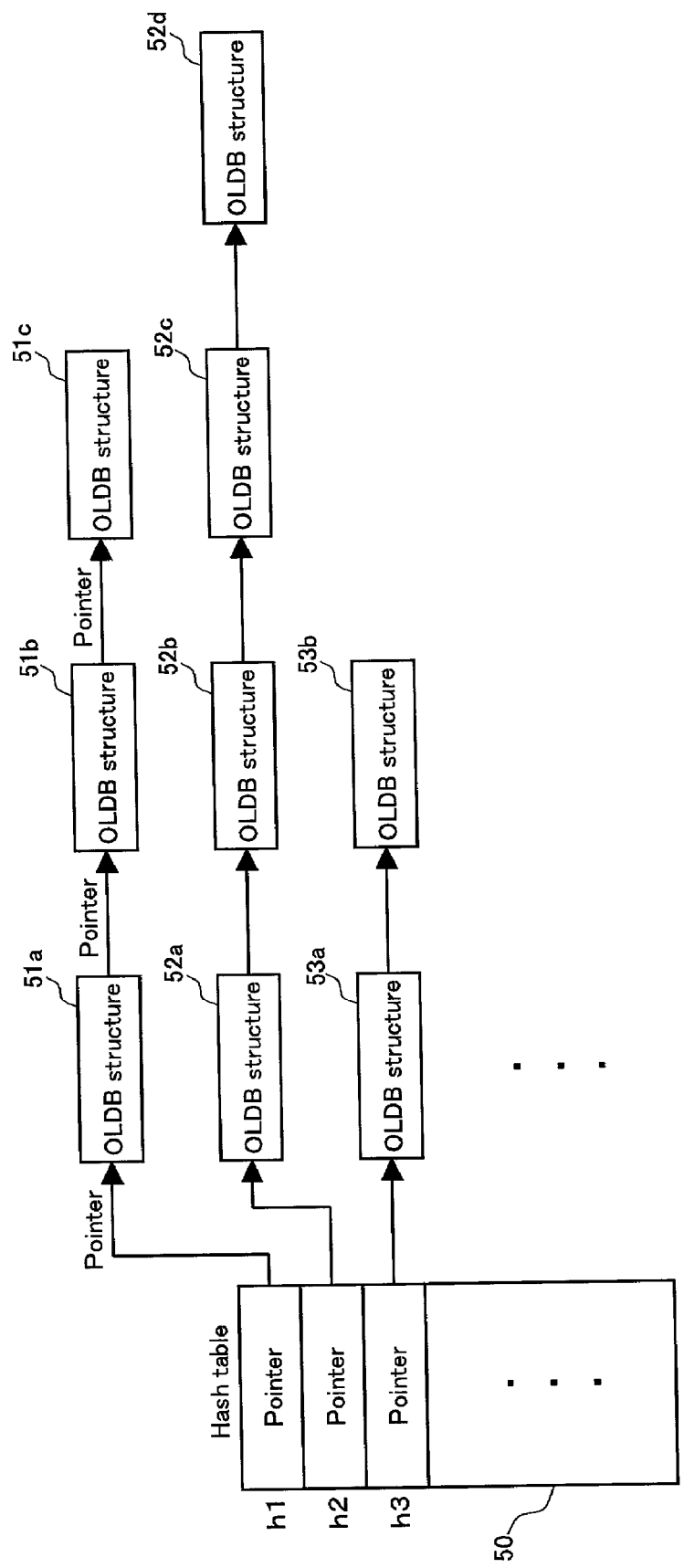
FIG. 12 shows a data configuration of an opaque LSA database.

Data configuration of the opaque LSA database and its update process FIG. 12 shows a data configuration of an opaque LSA database 32b provided in the memory device 32 of the router 11.

The opaque LSA database 32b has a hash table 50, opaque LSA database structures (hereinafter referred to as "an OLDB structure") 51a to 51c, 52a to 52d, 53a, 53b, etc having the opaque LSA of each router (containing the own router) 11.

The hash table 50 has a plurality of memory cells. Each memory cell is accessed with a hash value h1, h2, h3, or the like as its address. The hash value is determined by hashing the value of "an advertising router" (namely, the IP address of the advertising router) in the LSA header of the received opaque. A pointer to the OLDB structure is stored in each memory cell. For example, the pointer to the OLDB structure 51a is stored in the memory cell in correspondence to the hash value h1. The pointer to the OLDB structure 52a is stored in the memory cell in correspondence to the hash value h2, and the pointer to the OLDB structure 53a is stored in the memory cell in correspondence to the hash value h3, respectively. The pointers to the other OLDB structures (not shown) are also stored in the memory cells in correspondence to the other hash values (not shown).

The OLDB structure contains a content (each field shown in FIGS. 3 and 4) of the received opaque LSA. It also contains the pointer to the neighboring next OLDB structure (for example, the OLDB structure 51a contains the pointer to the next OLDB structure 51b), a field required for calculating a distance (cost) up to a root, etc. One router 11 corresponds to one OLDB structure.

As the hash value of the hash table 50, for example, it is possible to use a quotient (integer value) obtained by dividing an "advertising router" value (IP address) of the LSA header deemed as an integer by a prime 251. In this case, the hash table 50 has 251 memory cells, and the plurality of routers 11 in the connection network 1 are classified into 251 groups. The pointers connect the OLDB structures of the plurality of routers belonging to each group classified into the 251 groups, for example, like the OLDB structures 51a to 51c.

Incidentally, as the IP addresses of the routers belonging to the same group are close, the routers are placed at geographically close positions in many cases.

In this manner, as the routers can be classified into the groups by using the hash table, as described below, when retrieving the OLDB structure of a specified router, it is possible to accelerate the retrieval.

Figure 11:
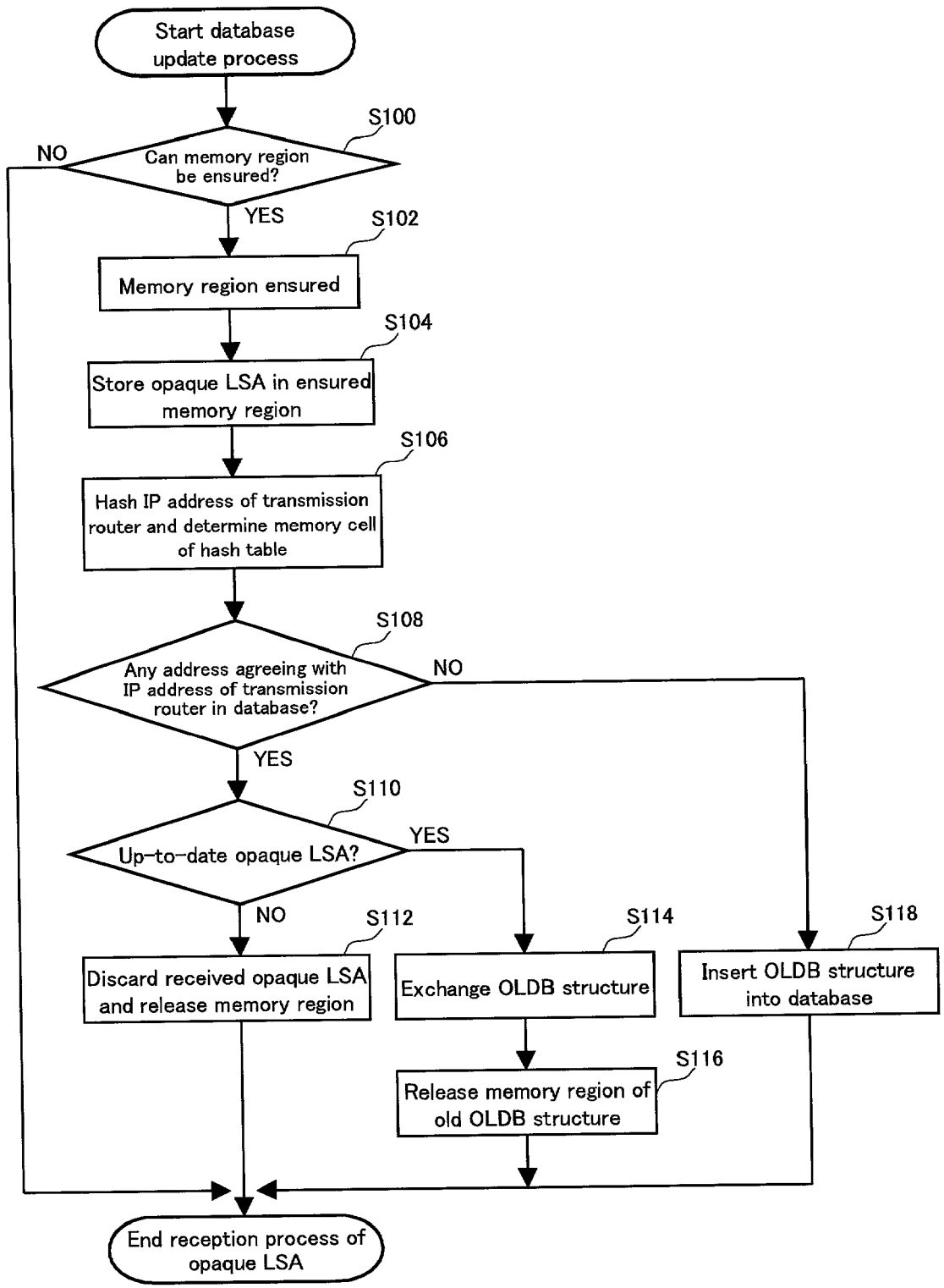
FIG. 11 is a flowchart showing a flow of a detailed process of an update process of the opaque LSA database.

FIG. 11 is a flowchart showing a flow of a detailed process of an update process of the opaque LSA database in steps S18, S23, S30 and S64 shown in FIGS. 7 to 10. The processing unit 30 of each router 11 executes this process.

First, the processing unit 30 determines whether or not it is possible to ensure a storage region of the OLDB structure for storing the opaque LSA within the memory device 32 (step S100). When it is possible to ensured (YES in step S100), the processing unit 30 ensures the storage region (step S102), and stores the received opaque LSA in the ensured storage region (step S104).

Subsequently, a hash value of the IP address of the router that transmitted the opaque LSA is calculated, and the memory cell having this hash value as address in the hash table 50 is determined (step S106). Subsequently, it is determined (namely, retrieved) whether or not there is an OLDB structure which agrees with the IP address of the router that transmitted the received opaque LSA from among one or more OLDB structures connected to the determined memory cell by the pointers (step S108). In this retrieval, since a retrieval scope is pinpointed to the group of the OLDB structures corresponding to one memory cell of the hash table 50, it is possible to retrieve at a high-speed.

When there is no coincident OLDB structure (NO in step S118), the OLDB structure which stored the received opaque LSA is connected to the endmost of the OLDB structure(s) connected to the memory cell determined in step S106. For example, when the hash value is h1 of FIG. 12, the OLDB structure of the received opaque LSA is connected to the rear of the OLDB structure 51c, and the pointer to the connected new OLDB structure is stored in the pointer region provided in the OLDB structure 51c.

On the other hand, in step S108, when there is any coincident OLDB structure (YES in step S108), it is determined whether or not the received opaque LSA is up-to-date (latest temporally) (in other words, the opaque LSA having the up-to-date traffic information) (step S110).

When the received opaque LSA is not up-to-date (NO in step S110), it is discarded and the memory region ensured in step S102 is released (step S112). On the other hand, when the received opaque LSA is up-to-date (YES in step S110), this up-to-date OLDB structure is exchanged for an old OLDB structure which has already existed in the database 32b (step S114). For example, when the OLDB structure 51b of FIG. 12 is exchanged by the OLDB structure (referred to as "an OLDB structure x") having the received new opaque LSA, the OLDB structure x is inserted into this same position. Alternatively, the OLDB structure 51c is connected to a very rear of the OLDB structure 51a, and also the OLDB structure x can be connected to a very rear of the OLDB structure 51c.

Subsequently, the memory region of the OLDB structure of the old opaque LSA is released (step S116), and the process is ended.

One Example of the Load Sharing

Finally, one example of a load sharing which is carried out on the basis of the traffic information of each router 11 stored in the opaque LSA database 32b will be explained as follow.

Respective logical bandwidths (bandwidths of LSP) [bps] of routes 1, 2, 3 (refer to FIG. 1) are set to 10 M, 8 M, 2 M, respectively.

In order to control the load sharing by means of the TE, the input-side router 11S (processing unit 30) first calculates each effective load of the routes 1, 2, 3. Here, "the effective load" is an effective usage rate that is calculated based on a usage rate of the link and a packet discard rate (packet loss rate) in this link. Although the actual load of the link had better be measured, this effective load is used, because it is difficult to measure the actual load directly in the case where the router 11 has a multistage switch configuration.

When the effective load of route i is set as $\rho\_effective\_path\_i$, this effective load can be acquired by the following equations (8) and (9), for example:

$$\rho\_effective\_path\_i = \rho\_path\_i \times f(Loss\_path\_i) \tag{8}$$

$$\rho\_effective\_path\_i = Min(\rho\_effective\_path\_i, \rho\_ceiling) \tag{9}$$

Here, $\rho\_path\_i$ is an average usage rate of the entire one or more links (link_j) which configures the route i (path_i), and is acquired by the following equation (10):

$$\rho\_path\_i = Average(Ave\_Utilization(link\_j, path\_i)) \tag{10}$$

Furthermore, Loss_path_i is the total of a discard packet number (Loss_link_j) of each link which configures the route i, and is acquired by the following equation (11):

$$\text{Loss\_path\_}i = \Sigma \text{Loss\_link\_}j \quad (11)$$

The function f is a function for correcting so as to calculate higher a load in the case where the discard of packet is carried out. This is because, when no packet is discarded, the link load ρ_path_i agrees with the effective load, and when the discard of packet is carried out, it is necessary to correct higher the load. ρ_ceiling is an upper limit value of the effective load.

Now, when the effective loads of the routes 1, 2, 3 are set to ρ_effective_path_1=0.5, ρ_effective_path_2=0.2 and ρ_effective_path_3=0.3, respectively, effective traffic amounts [bps] of the routes 1, 2, 3 are 10 M×0.5=5 M, 8 M×0.2=1.6 M and 2 M×0.3=0.6 M, respectively.

Subsequently, the router 11S (processing unit 30) performs load adjusting. First, all the routes 1, 2, 3 are deemed as a virtual single pipe, and the average usage rate ρave_effective of this pipe is acquired by the following equation:

$$\rho\text{ave\_effective} = \Sigma(\rho\text{\_effective\_path\_}i \times LBW\text{\_path\_}i) \div \Sigma LBW\text{\_path\_}i \quad (12)$$

Here, LBW_path_i is a logical bandwidth of the route i.

When the equation (12) applies the above-mentioned example, $$\rho\text{ave\_effective} = (5\,M + 1.6\,M + 0.6\,M)/(10\,M + 8\,M + 2\,M) = 0.36$$

Next, effective bandwidth ΔEBW_path_i [bps] which shifts between the routes is calculated by the following equation:

$$\Delta EBW\text{\_path\_}i = (\rho\text{ave\_effective} - \rho\text{\_effective\_path\_}i) \times LBW\text{\_path\_}i \quad (13)$$

When this is calculated in each of the routes 1, 2, 3, the following answer is obtained:

The effective bandwidth ΔEBW_path_1, shifting in the route 1=(0.36−0.5)×10 M=−1.4 M The effective bandwidth ΔEBW_path_2, shifting in the route 2=(0.36−0.2)×8 M=+1.28 M The effective bandwidth ΔEBW_path_3, shifting in the route 3=(0.36−0.3)×2 M=+0.12 M The total of the effective bandwidths shifting in the routes is −1.4 M+1.28 M+0.12 M=0

When the load adjusting is performed based on this calculation result, in the route 1, 5 M−1.4 M=3.6M, and in the route 2, 1.6 M+1.28 M=2.88 M, and in the route 3, 0.6 M+0.12 M=0.72 M, and in the routes 1, 2, 3, the load sharing (distribution of the traffic) is changed at a ratio of 3.6×Gr: 2.88×Gr:0.72×Gr. The symbol Gr denotes a load adjusting coefficient.

According to the present invention, the nodes in the communication network can collect the information in the traffic in the communication network, and control the load sharing by the information.

What is claimed is:

1. In a communication network having a plurality of nodes, which transmit, receive or transfer communicated information, and a plurality of links, which connect the plurality of nodes to each other, a traffic information collecting device, which is provided in at least one of the plurality of nodes, for collecting traffic information of all or some of the plurality of links, comprising:

a traffic information collecting unit for collecting first traffic information of a first link connected to an own node among the plurality of links;

a traffic information transmitting unit for transmitting, to other nodes, said first traffic information collected by said traffic information collecting unit, using a message prescribed in a communication protocol in the communication network;

a traffic information receiving unit for receiving second traffic information of second links connected to the other nodes among the plurality of links, said second traffic information being transmitted from the other nodes; and a traffic information storage for storing said first and second traffic information, wherein said first and second traffic information, respectively, includes an average usage rate of the first and second links, the number of a packet discarded in the first and second links, and a bandwidth of the first and second link; and in the case where a logical link is provided in the first and second link, an average usage rate of the logical link, the number of a packet discarded in the logical link, and a bandwidth of the logical link.

2. The traffic information collecting device according to claim 1, wherein said traffic information transmitting unit transmits the first traffic information at predetermined fixed time intervals.

3. The traffic information collecting device according to claim 1, wherein said traffic information transmitting unit transmits the first traffic information when said traffic information receiving unit receives the second traffic information.

4. The traffic information collecting device according to claim 1, wherein said traffic information transmitting unit transmits the first traffic information at predetermined fixed time intervals, as well as when said traffic information receiving unit receives the second traffic information.

5. The traffic information collecting device according to claim 1, further comprising:

a traffic information transferring unit for transferring the second traffic information received by said traffic information receiving unit to the other first links excluding the received first link.

6. The traffic information collecting device according to claim 1, wherein said first and second traffic information is traffic information of a link for outputting the traffic.

7. The traffic information collecting device according to claim 1, wherein said traffic information collecting unit collects the first traffic information at predetermined fixed time intervals.

8. The traffic information collecting device according to claim 1, wherein said message in the communication protocol is an opaque link state advertisement in the OSPF protocol.

9. The traffic information collecting device according to claim 1, wherein said node is a router.

10. The traffic information collecting device according to claim 1, wherein the node having the traffic information collecting device is a node for controlling a load sharing of the traffic in the communication network.

11. The traffic information collecting device according to claim 1, wherein said traffic information storage comprises a hash table and structure data having the first or second traffic information of the respective nodes, said hash table having a memory cell, said memory cell being addressed by a hash value obtained by hashing information for identifying the respective nodes, and storing a pointer to the structure data having the first or second traffic information of the node in correspondence to the hash value of the memory cell, and said structure data having a pointer to another structure data when there is another structure data in correspondence to the same hash value.

12. The traffic information collecting device according to claim 1, wherein in the case where the first or second traffic information of the same node have already existed in said traffic storage when the first or second traffic information is stored in same, said traffic information storage stores the first or second traffic information which is later temporally among them.

13. A node in a communication network having a plurality of nodes for transmitting, receiving or transferring communicated information, and a plurality of links for connecting the plurality of nodes to each other, comprising:
  a traffic information collecting unit for collecting first traffic information of a first link connected to an own node among the plurality of links;
  a traffic information transmitting unit for transmitting, to other nodes, said first traffic information collected by said traffic information collecting unit, using a message prescribed in a communication protocol in the communication network;
  a traffic information receiving unit for receiving second traffic information of second links connected to the other nodes among the plurality of links, said second traffic information being transmitted from the other nodes; and
  a traffic information storage for storing said first and second traffic information,
  wherein said first and second traffic information, respectively, includes an average usage rate of the first and second links, the number of a packet discarded in the first and second links, and a bandwidth of the first and second link; and in the case where a logical link is provided in the first and second link, an average usage rate of the logical link, the number of a packet discarded in the logical link, and a bandwidth of the logical link.

14. In a communication network having a plurality of nodes for transmitting, receiving or transferring communicated information, and a plurality of links for connecting the plurality of nodes to each other a traffic information collecting method for collecting traffic information of all or some of the plurality of links, and performed by at least one of the plurality of nodes, comprising the steps of:
  collecting first traffic information of a first link connected to an own node among the plurality of links;
  transmitting, to other nodes, said first traffic information, using a message prescribed in a communication protocol in the communication network;
  receiving second traffic information of second links connected to the other nodes among the plurality of links, said second traffic information being transmitted from the other nodes; and
  storing said first and second traffic information in a storage provided in the node,
  wherein said first and second traffic information, respectively, includes an average usage rate of the first and second links, the number of a packet discarded in the first and second links, and a bandwidth of the first and second link; and in the case where a logical link is provided in the first and second link, an average usage rate of the logical link, the number of a packet discarded in the logical link, and a bandwidth of the logical link.

15. In a communication network having a plurality of nodes for transmitting, receiving or transferring communicated information, and a plurality of links for connecting the plurality of nodes to each other, a traffic information collecting program product for collecting traffic information of all or some of the plurality links, and executed by at least one of the plurality of nodes, comprising:
  a collecting process for collecting first traffic information of a link connected to an own node among the plurality of links;
  a transmitting process of transmitting, to other nodes, said first traffic information, using a message prescribed in a communication protocol in the communication network;
  a receiving process for receiving second traffic information of second link connected to the other nodes among the plurality of links, said second traffic information being transmitted from the other nodes; and
  a storing process for storing said first and second traffic information in a storage provided in the nodes,
  wherein said first and second traffic information respectively, includes an average usage rate of the first and second links, the number of a packet discarded in the first and second links, and a bandwidth of the first and second link; and in the case where a logical link is provided in the first and second link, an average usage rate of the logical link, the number of a packet discarded in the logical link, and a bandwidth of the logical link.

* * * * *